United States Patent [19]
Morton

[11] Patent Number: 4,922,336
[45] Date of Patent: May 1, 1990

[54] THREE DIMENSIONAL DISPLAY SYSTEM

[75] Inventor: Roger R. A. Morton, Penfield, N.Y.

[73] Assignee: Eastman Kodak Company, Rochester, N.Y.

[21] Appl. No.: 405,253

[22] Filed: Sep. 11, 1989

[51] Int. Cl.$^5$ ............................................. H04N 13/04
[52] U.S. Cl. ....................................... 358/88; 358/89; 358/903
[58] Field of Search ...................... 358/88, 89, 90, 91, 358/92, 3, 903; 364/522; 352/86

[56] References Cited

U.S. PATENT DOCUMENTS

| | | | |
|---|---|---|---|
| 2,189,374 | 2/1940 | Surbeck | 88/24 |
| 3,202,985 | 8/1965 | Perkins et al. | 343/7.9 |
| 3,324,760 | 6/1967 | Collender | 88/24 |
| 3,428,393 | 2/1969 | De Montebello | 352/43 |
| 3,462,213 | 8/1969 | De Montebello | 352/86 |
| 3,682,553 | 8/1972 | Kapany | 356/4 |
| 3,956,833 | 5/1976 | Chase | 358/89 X |
| 4,130,832 | 12/1978 | Sher | 358/89 |
| 4,294,523 | 10/1981 | Woloshuk et al. | 352/86 |
| 4,297,009 | 10/1981 | Mezzrich et al. | 352/86 |
| 4,414,565 | 11/1983 | Shanks | 358/89 |
| 4,649,425 | 3/1987 | Pund | 358/88 |
| 4,737,921 | 4/1988 | Goldwasser et al. | 364/518 |
| 4,853,769 | 8/1989 | Kollin | 358/88 |

FOREIGN PATENT DOCUMENTS 0257695 12/1985 Japan ..................... 358/88

OTHER PUBLICATIONS

J. D. Foley et al, Fundamentals of Interactive Computer Graphics, (©1982, Addison-Wesley Publishing Co.), pp. 505–511.

Primary Examiner—Edward L. Coles, Sr.
Assistant Examiner—Victor R. Kostak
Attorney, Agent, or Firm—Dennis R. Arndt

[57] ABSTRACT

A system that is able to display an object in three dimensions and an accompanying method for use therein. Specifically, through this system, a three-dimensional image is displayed as a series of segments, e.g. line segments, formed by intersecting those surfaces of an object that are visible to a viewer with a sequence of pre-defined parallel helical surfaces taken through the object, with substantially the same pitch and axial orientation as that of a rotating helical reflector. Each dot in a resulting segment is then projected through both a focusing lens and an anamorphic lens onto a spatially corresponding portion of the rotating helical reflector. The anamorphic lens, which rotates in unison with the helical reflector, ensures, in conjunction with the focusing lens, that each dot will be focused on a given point along the reflector. By painting each such segment on a different portion of the reflector, the reflector, as it rotates, will sweep out a focused displayed volume. As a result and due to the persistence associated with human vision, a three-dimensional self-radiant "ghost-like" image of the object will appear to be displayed about the central (longitudinal) axis of the reflector. As fewer intersecting segments are painted on each rotation of the reflector, the image will increasingly appear as a "wire-frame" outline of the contours and edges of the object. However, as the number of such segments painted on the reflector increases per each rotation thereof, the three-dimensional image of the object will increasingly appear to "fill in". The displayed image contains appropriate visual information, such as stereoscopic, parallax and focus affects, such that it provides a relatively accurate three-dimensional depiction of the object.

32 Claims, 4 Drawing Sheets

THREE DIMENSIONAL DISPLAY SYSTEM

TECHNICAL FIELD OF THE INVENTION

The invention relates to a system that is able to display an object in three dimensions and a method for use therein.

BACKGROUND ART

The need to display a three-dimensional object to a viewer can occur in a variety of applications, such as in medical imaging, graphics (e.g. computer aided engineering, computer aided design and the like) or entertainment. Currently, photographic as well as presently available electronic display technologies, such as cathode ray tube (CRT) monitors, liquid crystal displays, plasma panels and the like, rely on displaying an object in only two dimensions.

Specifically, conventional photographic film is itself a flat two-dimensional medium which is unable to record three-dimensional information inherent in a scene. In particular, if one object is placed partially in front of another object in a scene and a photograph is then taken at a zero degree offset angle from the front of that scene, the resulting photograph will show a front view of that scene wherein one object is shown partially in front of the other object but will fail to reveal the separation between these two objects. The depth information inherent in the scene will simply not be recorded in this instance. By contrast, some depth information can be photographically recorded if another photograph were to be taken at a angle offset from the centerline of the image thereby providing a two-dimensional perspective image of both objects in which one dimension partially conveys the depth information. However, if the relative offset angle between these images depicted in the two photographs is excessive, then it becomes very difficult for a viewer to properly construct an adequate mental three-dimensional image of the photographed scene. Now, by comparing two photographed images of the same scene taken from slightly different perspectives, where each perspective approximately matches that for the same scene as seen by a corresponding eye of a human observer, as would be the case with stereoscopic photography, then a pair of human eyes, when simultaneously viewing the resulting photographs, is then able in conjunction with the visual center in the viewer's brain to combine the images such that the viewer will visually perceive an acceptable three-dimensional view of the scene. Unfortunately, stereoscopic cameras require two separate lenses and slaved shutter assemblies and are thus mechanically complex. Furthermore, stereoscopic cameras and associated equipment are not widely available. In addition, stereoscopic prints and slides require special viewing equipment that places both of the two photographed images, which collectively form a single stereoscopic image, at the correct separation and distance from the eyes of a viewer in order to produce a relatively accurate stereoscopic image. Unfortunately, this viewing equipment tends to be cumbersome to use and quite bulky. For these reasons, stereoscopic photography, which has been in existence for quite some time, has seen relatively little use. In addition, stereoscopic images do not provide parallax affects, i.e. where an image of an object changes in response to the changing perspective imparted to a viewer as that viewer moves his or her head from one side of the object to the other. Since parallax provides important depth cues, omission of parallax affects restricts the three-dimensional accuracy inherent in a stereoscopic image. U.S. Pat. No. 4,649,425 (issued to Pund on Mar. 10, 1987) describes an electronically based stereoscopic system in which the system monitors the position of a viewer and adjusts the current position of each individual image based upon the detected position of the viewer. This system, similar to the manual stereoscopic approaches, also fails to display parallax affects.

Electronic technologies for capturing an image of a scene predominantly rely on scanning that image using well-known two-dimensional raster scan techniques. As such, the scanned image only provides a two-dimensional view of a three-dimensional scene and thereby, in a similar fashion as a photographed image, suppresses depth information from the scanned scene. An electronic display that relies on use of two individual display elements to achieve a stereoscopic affect would suffer the same loss of parallax as with such photographic displays. Relatively new electronic imaging technologies, such as tomography and the like, are able to produce a cross-sectional view through an object, such as a cross-sectional view of a patient taken transverse to that patient's spine.

Given these limitations in the technologies currently used to capture an image and/or stereoscopically display that image, it appears that the art has endeavoured to display a three-dimensional object (or scene) primarily from a sequence of two-dimensional sectional images thereof which have either been photographically or electronically obtained rather than to display the object through stereoscopic techniques.

The simplest of all approaches known in the art that attempts to produce a three-dimensional representation of an object is simply for a viewer to arrange a "stack" of photographic images, with each image being of a different section of the object. All the sections are taken in the same direction through the object. These images would be arranged in a particular sequence with the image of an uppermost section of the object being on the top of the stack, followed by images of sections occurring at increasing depths from the top, and ending with the image of the lowest section of the object located at the bottom of the stack. With this stack, the viewer would then quickly "thumb" through these images, i.e. successively view each image in the sequence for only a fraction of a second. In this manner, the viewer, using the persistence associated with his or her vision, would, if the images are sequenced at approximately the right speed, see each image superimposed onto the previous image(s) and thereby perceive a crude three-dimensional depiction of the object. Unfortunately, this method is highly dependent upon the skill of the user. To obtain even a crude three-dimensional display, the speed at which the images are sequenced must be chosen sufficiently fast to avoid flicker but yet sufficiently slow to enable the viewer's eye to perceive and then retain each image. As one can readily appreciate, this technique is very cumbersome to use and, based upon the skill of all the viewers, produces very inaccurate and highly inconsistent results.

With this in mind, the art has turned to various techniques that attempt to mechanize the display of a sequence of photographic images in order to reliably produce three-dimensional images. One such technique, such as that disclosed in U.S. Pat. Nos. 3,428,393 (issued to de Montebello on Feb. 18, 1969) and 3,462,213 (issued to de Montebello on Aug. 19, 1969), relies on projecting each image in a pre-defined sequence of photographic "sectional" images through a rotating spirally or helically shaped projection screen that has a transmissive and diffusive surface. Unfortunately, the systems disclosed in these patents are physically large, mechanically relatively complex and, owing to the need to transmit light through a diffusive screen, exhibit a loss of image brightness. A similar system is disclosed in U.S. Pat. No. 4,294,523 (issued Oct. 13, 1981 to Woloshuk et al) in which each image in a sequence of two-dimensional "sectional" images is arranged in a film strip and then momentarily illuminated. The resulting image is then projected through a transmissive projection screen that moves in synchronism with a rate at which the individual images are illuminated. Disadvantageously, the system is mechanically large and also, by virtue of projecting an image through a screen, suffers a loss of image brightness. Another, basically similar system, though described for use as a three-dimensional radar display, is disclosed in U.S. Pat. No. 3,202,985 (issued to Perkins et al on Aug. 24, 1965 — hereinafter referred to as the '985 Perkins et al patent) wherein a succession of individual images are projected onto a rotating spherical spiral screen where the radius of the screen at a current rotational angle and at a given moment corresponds to the angular orientation of a radar antenna at that moment. Because the system disclosed in the '985 Perkins et al patent requires a mirror, which directs a point source of illumination, to mechanically move at a relatively high speed to sweep out a volume on the rotating screen in a controlled three-dimensional manner and in synchronism with the three-dimensional movement of the radar antenna, this system is rather complex and difficult to implement. Another technique as disclosed in U.S. Pat. No. 4,297,009 (issued to Mezzrich et al on Oct. 27, 1981) relies on placing a sequence of two-dimensional images, specifically transparencies, of varying sectional views of an object along an annular region of a disk. The disk is then rotated at a relatively high speed with all images being successively illuminated one at a time and displayed on a rotating spiral screen. The resulting image seen by the viewer appears to be three-dimensional composite of the individual two-dimensional images. Unfortunately, this technique is hampered by a rather limited viewing angle.

Therefore, a specific need exists in the art for a three-dimensional display system that at least reduces, if not eliminates, the deficiencies associated with three-dimensional display systems known in the art.

DISCLOSURE OF THE INVENTION

Accordingly, an object of the present invention is to provide a display system that generates a three-dimensional image (such as for an object) which has sufficient visual cues, including focusing, stereoscopic and parallax affects, such that the resulting image is relatively accurate.

A specific object is to provide such a system produces relatively accurate three-dimensional images on a consistent basis, regardless of the skill level of the viewer.

Another specific object is to provide such a system that does not exhibit the same loss of image brightness or possess as limited a viewing angle as do various prior art systems.

Another specific object is to provide such a system that is relatively simple to implement, and is not cumbersome nor physically bulky.

These and other objects are accomplished in accordance with the teachings of my inventive three-dimensional display system which has: a helical reflector adapted for rotation about its central axis; an anamorphic lens coaxially aligned with and adapted for rotation in unison with the helical reflector; a two-dimensional display arranged to project light therefrom through the anamorphic lens onto the helical reflector; and a display generator, typically a graphic workstation, which itself has: means, responsive to a database of stored information which contains a three-dimensional description of an object, for determining each successive one in a series of incrementally spaced pre-defined helical sections taken through the object; means, responsive to a current position of a viewer and to the database, for ascertaining those surfaces of the object which, if displayed, would be visible to the viewer; means for determining a series of intersecting segments, wherein each segment in the series occurs as an intersection between a corresponding one of the helical sections and at least one of the visible surfaces of the object; and means for successively and selectively projecting each intersecting segment in the series onto the two-dimensional display, illustratively a projection CRT display, in response to a current position of the helical reflector, whereby as the helical reflector rotates the segments projected thereon sweep out a focused three-dimensional, typically "ghost-like", volume that depicts the object.

In accordance with a preferred embodiment of the invention, the display system also includes a focusing lens that is coaxially aligned with said anamorphic lens and situated in an optical path between said anamorphic lens and the two-dimensional display. The focusing lens in conjunction with the anamorphic lens focuses light incident thereon from a given point on the two-dimensional display onto a pre-defined point on the helical reflector. In addition, the anamorphic lens is constructed from a planar "array" of individual small lens that are molded or otherwise affixed into a common holder. In order to ensure that the light projected from each point on the screen of the two-dimensional display through the focusing and anamorphic lenses and onto the helical reflector is in-focus at only one corresponding point on the reflector, the individual lens vary in cross-section and hence magnifying power based upon the focal length between the vertical position between each individual lens situated in the anamorphic lens and the closest surface thereto, in the axial direction, of the helical reflector. Those individual lenses located relatively close to the surface of the reflector have a concave cross-sectional shape and possess relatively lower magnifying powers than the individual lenses which are located relatively far from the surface of the reflector and which possess a convex cross-sectional shape. Those individual lenses, that are situated within the anamorphic lens and intermediate the convex and concave lenses, have relatively flat surfaces (rectangular cross-sectional shape) and thereby possess magnifying powers intermediate to those associated with the concave and convex lenses.

Furthermore, a video camera and video processor are used to provide coordinates associated with the current position of the viewer. By appropriately varying the three-dimensional display of the object in response to changes in the current position of the viewer, the inventive system imparts parallax affects into the displayed object. Inasmuch as the inventive system provides stereoscopic, focus and also parallax affects as part of the three-dimensional display, this display is more accurate and more realistic than that which could be produced through three-dimensional display systems known in the art.

BRIEF DESCRIPTION OF THE DRAWINGS

The teachings of the present invention may be readily understood by considering the following detailed description in conjunction with the accompanying drawings, in which.

To facilitate understanding, identical reference numerals have been used to denote identical elements that are common to various figures.

MODES OF CARRYING OUT THE INVENTION

After reading the following description those skilled in the art will clearly realize that my inventive system will find use in a wide variety of display applications, such as in medical imaging, computer graphics, entertainment and others. For the sake of simplicity, the following discussion will describe the invention in the context of displaying a simple three-dimensional geometric object, i.e. an inclined rectangular cylinder.

In contrast to the art, my inventive system relies on displaying a three-dimensional image of an object by projecting a succession of intersecting segments from a two-dimensional display, such as a projection cathode ray tube (CRT) display, through both a focusing lens and an anamorphic lens onto a spatially corresponding portion of a rotating helical reflector. Each segment, such as for example a line segment, is formed of the intersection of a visible outside surface of the object with a corresponding helical section taken through the object. The anamorphic lens, which rotates in unison with the helical reflector, ensures, in conjunction with the focusing lens, that each dot produced on the screen of the projection CRT display will be focused only on one given point along the reflector. By painting each such segment on a different portion of the reflector, the reflector will sweep out a accurately focused displayed volume as it rotates and thereby impart depth, i.e. a "z" dimension, to the image. As a result, a three-dimensional self-radiant "ghost-like" image of the object is displayed on the reflector and located about the central axis thereof. Furthermore, the image can be depicted as having a substantially solid appearance if it is appropriately "rendered" with simulated light sources using rendering software packages such as "Renderman" available from Pixor Inc. Based upon the number of successive intersecting segments that are painted on the reflector during each of its rotations, the three-dimensional image can be made to appear as "wire-frame" outline of the contours and edges of the object or as a filled volume therefor. The spacings between individual "wires" decrease in systems having increased rotational speeds and corresponding frame rates. The displayed image contains appropriate visual information, such as stereoscopic, parallax and focus affects, such that it provides a relatively accurate three-dimensional depiction of the object.

Figure 1:
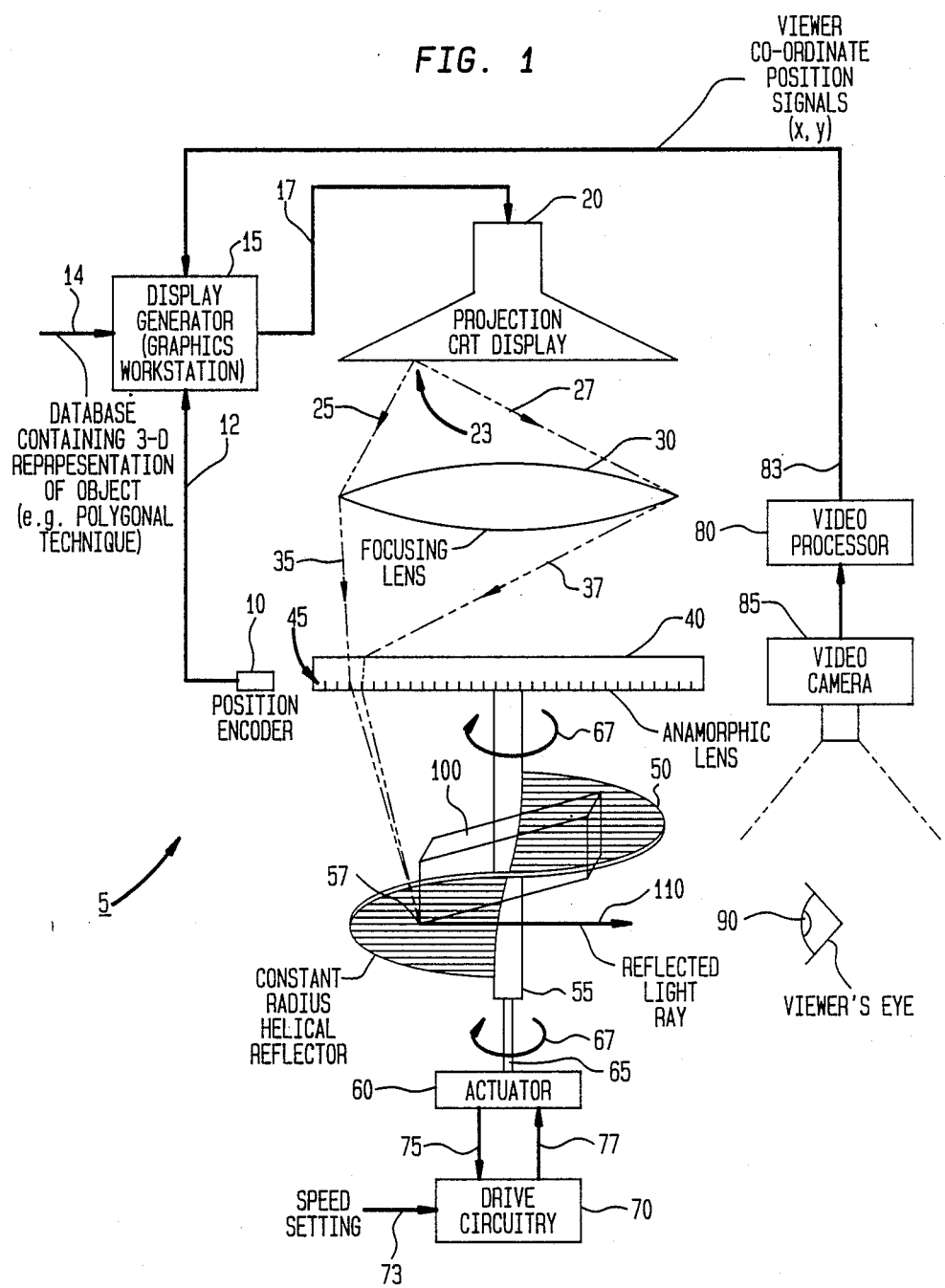
FIG. 1 depicts a block diagram of an embodiment of three-dimensional image display system 5 constructed in accordance with the teachings of the present invention.

With the above in mind, FIG. 1 depicts a block diagram of an embodiment of three-dimensional image display system 5 constructed in accordance with the teachings of my invention. As shown, system 5 contains display generator 15 which displays a succession of single vectors on a screen of projection CRT 20. The display generator calculates, using well-known three-dimensional graphical techniques, each vector as being a segment, e.g. a line segment, of intersection between the visible surfaces of an object, here the object being an inclined right rectangular cylinder, that is to be displayed and one of a series of parallel helical sections taken through that object. To do so, display generator 15 is first supplied, as represented by line 14, from an external source with a database that describes a three-dimensional space filling volumetric representation of the object that is to be displayed. This representation can be fabricated through any one of a variety of three-dimensional graphics techniques that are well-known in the art. One such technique represents a three-dimensional object through a series of polygons, hence producing a "polygon mesh". In this regard, see J. D. Foley et al, *Fundamentals of Interactive Commuter Graphics*, (© 1982, Addison-Wesley Publishing Co.), pages 505–511. Regardless of the specific manner in which the object is represented, a sequence of successive parallel helical sections, each taken at an incrementally different vertical height through the object but with the same pitch and axial orientation as that of the helical reflector, is calculated by display generator 15. These sections can either be calculated in real-time while a visual three-dimensional display is being produced or calculated at some earlier time and then stored on, for example, a hard disk (not specifically shown) that forms a part of the display generator for subsequent access during formation of that display. As discussed below, the intersecting segments, e.g. line segments, between each of these sections and the surfaces that are then currently visible to a viewer are calculated by the display generator. Each intersecting segment is then vectorized and, through a vector generator (well-known and also not specifically shown) located internal to display generator 15, causes a corresponding two-dimensional vector to be painted onto the display screen of projection CRT 20. Display generator 15 can be any one of a variety of commercially available graphics workstations, such as illustratively a model 4300 workstation manufactured by Sun Microsystems, Inc., that is capable of driving projection CRT 20 at a sufficiently high speed. However, it will be appreciated that special purpose display system designs using similar technologies which provide higher frame rates will allow higher rotational speeds and hence better image quality.

The optical path of system 5 contains projection CRT 20, focusing lens 30, anamorphic lens 40 and helical reflector 50. Helical reflector 50 is a reflector formed of a single turn of a constant radius spiral, such as a single turn of an "Archimedes screw". The radius is not critical and should be chosen to approximately match that of anamorphic lens 40. Inasmuch as the size of the viewing area is determined by the radius of these components, these components should be sized in order to provide a comfortably large viewing area. This reflector is fabricated around shaft 55. In order to rotate the reflector, in illustratively the direction shown by arrows 67, about it central axis, one end of shaft 55 is mechanically coupled to drive shaft 65 of actuator 60. This actuator is typically a well-known servo-controlled DC motor that can rotate at a constant controlled speed. The actuator typically contains an internal tachometer (not specifically shown) which provides an analog signal proportional to speed of drive shaft 65. This signal is applied, over leads 75, to drive circuitry 70 which, in response to this signal and a speed setting signal—such as an analog voltage level from a control potentiometer (not shown)—appearing on lead 73, generates suitable drive signals over leads 77 to cause the armature of actuator 60 to continuously rotate at the selected speed. Alternatively, actuator 60 could also be implemented using an appropriate stepping motor. Anamorphic lens 40 is mounted to the end of shaft 55 situated opposite to that connected to actuator 65. As such, this lens is synchronized to and rotates in unison with reflector 50. To eliminate any distortion to the three-dimensional image caused by an air atmosphere, such as through smoke, dust or the like, the optical components, including lenses 30, 40 and helical reflector 50 can all be enclosed in a sealed enclosure that is completely filled with a suitably clear stable gaseous atmosphere, for example nitrogen, argon, helium or the like. The enclosure can be transparent to afford viewing from any direction or contain a transparent viewing port. To further minimize any optical distortion resulting from an air atmosphere, the screen of the projection CRT would likely abut against an external surface of lens 30 with the lens itself being situated in an appropriate wall of the enclosure.

The magnification provided by anamorphic lens 40 varies across from one side of the lens to the other as does its focal length in contrast to focusing lens 30 which has a fixed focal length. Together, anamorphic lens 40 and focusing lens 30 collect and focus the light emanating from each point on the screen of projection CRT 20 onto an appropriate point on helical reflector 50. As can be seen from FIG. 1, the vertical distance between anamorphic lens 40 and the closest surface thereto, in the axial direction, of the helical reflector, and hence the focal length therebetween, changes from one side of lens 40, e.g. the right side as shown in the figure, to the other, i.e. the left side. Accordingly, to ensure that the light projecting from CRT 20 and through lens 30 and 40 onto each point on the helical reflector is always in focus at only that point on the reflector, the magnification provided by lens 40 varies from one side of this lens to the other. To simplify this lens, it is merely shown in FIG. 1 as having a rectangular side view. Lens 40 can be fabricated through either one of two methods. First, lens 40, as described in detail below in conjunction with FIGS. 2, 3 and 4, can be made as a planar "array" of closely spaced individual small lenses molded or otherwise affixed into a common holder, such as that made from illustratively plastic or a similar material. Each of these small lenses situated within the left side of lens 40 has a convex shape; while each of the small lenses situated within the right side of lens 40 and has a concave shape. As such, each of the small lenses on the left side of lens 40 provides a relatively higher degree of magnification than each such lens situated on the right side of lens 40. Each of the individual lenses situated within anamorphic lens 40 and intermediate to the convex and concave lenses has relatively flat surface contours and hence provides a magnifying power intermediate to that provided by the concave and convex lenses. Alternatively, lens 40 could be fabricated from a single piece of optical glass with continuous surfaces but with a suitably changing cross-sectional area in order to provide the necessary variation in magnification with positional variations across the face of the lens. However, fabricating such a single piece lens is certainly considerably more difficult than assembling a planar "array" of suitably small lenses into a common frame. Moreover, if the local magnification provided by anamorphic lens 40, and specifically the magnification provided by each individual lens that forms lens 40, is sufficiently strong, then this can advantageously eliminate the need to use a separate focusing lens, such as focusing lens 30, in system 5. Accordingly, the light projected by display 20 would be directly incident onto the anamorphic lens.

Lens 40 also contains positioning indicia 45 uniformly distributed around its periphery. These indicia, in conjunction with position encoder 10, provides a train of position pulses on lead 12. These pulses are counted by display generator 15 as lens 40 rotates in order to determine the current angular orientation of the lens. The specific form, which is not critical, of these indicia, i.e. whether they are locally magnetic or reflective areas, notches or otherwise, depend upon the particular technology chosen for encoder 10. These indicia and the encoder also provide a "home" pulse over leads 12 such that the display generator can synchronize itself to a known position of lens 40 and helical projector 50 at system start-up. Alternatively, a position encoder could be mounted within actuator 60 with suitable position feedback signals being applied, through suitable conditioning circuitry (not shown), to display generator 15 in lieu of using position encoder 10.

Now, with the inventive system thus far described, the present discussion will now shift to address the manner in which the inventive system generates a three-dimensional image and then address the remaining elements in the system, namely video camera 85 and video processor 80 and their use.

Since any three-dimensional object reflects light in three dimensions, any three-dimensional image of that object must also reflect light on the same three-dimensional basis as does the object. This is accomplished through my inventive system which paints each vector in a sequence—the sequence being the intersecting line segments between visible surfaces of the object and a successive helical sections thereof—on projection CRT 20 and from there, via lenses 30 and 40, onto reflector 50 in synchronism with the corresponding incremental rotational position of both lens 40 and helical reflector 50.

Specifically, as the helical reflector (and the anamorphic lens) rotates, its position is tracked by display generator 15 in response to the position pulses appearing over leads 12. At each incremental rotational position of the helical reflector, display generator paints a different vector on the screen of CRT display 20. This vector is a intersecting line segment between a particular helical section of the object and the visible surfaces thereof. As a result, through focusing lens 30 and anamorphic lens 40, every point on this segment is focused onto corresponding points located along the helical reflector. For example, if point 23 were illuminated on the screen of projection CRT 20 then the resulting illumination at this point, indicated simply by light rays 25 and 27, propagates through focusing lens 30 and anamorphic lens 40 and, as light rays 35 and 37, would then be focused on point 57 located on helical reflector 50. The light would then be reflected off the reflector in illustratively the direction of light ray 110 towards eye 90 of a human viewer. Now, as the helical reflector continues to rotate, different vectors are painted onto the screen of projection CRT 20 based upon the position of the reflector and anamorphic lens 40. As the helical reflector continues to incrementally rotate, each of the vectors would be singly and successively painted onto the screen of projection CRT 20 and thereby onto different regions of the reflector. As can be appreciated, each different vector, which corresponds to a particular section through the object, would be painted onto a corresponding line segment on the helical reflector as the reflector rotated. The light reflected from the reflector into the viewer's eye would, due to the persistence associated with human vision, fill an apparent visual volume, e.g. inclined rectangular cylinder 100, that is centered about the longitudinal axis of the reflector and is an accurate though "ghost-like" self-radiant depiction of the object being displayed. Projection CRT 20 only paints one vector at a time, though, again to the persistence of human vision, the screen of the CRT would appear blurred as a three-dimensional image is being generated. It is the helical reflector, together with lenses 30 and 40, that extracts the necessary depth information from the sequence of two-dimensional vectors painted onto the CRT. In order to generate a substantially flicker-free three-dimensional display, the helical reflector should repeatedly paint the image at a minimum rate of at least of 25 Hz which corresponds to a minimum rotational speed of 1500 revolutions/minute (rpm) for the reflector. In addition, a number of successive intersecting line segments of the object should be generated for each rotation of the reflector. If relatively few intersecting line segments (vectors), such as illustratively less than approximately eight such line segments, of the object are generated with each rotation of the reflector, then the resulting three-dimensional image will increasingly appear as a "wire-frame" outline of the contours and edges of the object. However, as the number of such line segments painted on the reflector increases per each rotation thereof, the three-dimensional image of the object will increasingly appear to be "filled in". For example, if a 4 inch (approximately 10 centimeter) high three-dimensional image is to be generated using forty helical sections for each rotation of the helical reflector, then, for uniformity, these sections and then resulting intersecting line segments that collectively form the image would be spaced apart by 0.1 inch (approximately 0.25 centimeters). Clearly, as the number of these line segments increases, the spacing therebetween will decrease thereby causing the image to progressively "fill in". With eight vectors being painted onto the projection CRT for each rotation of the reflector, then the display generator is required to possess a video frame rate of 8*25 or 200 frames/second. This frame rate is easily obtainable with currently available graphics workstations of the type described above. The resulting three-dimensional display provides both stereoscopic and focus affects.

Figure 6:
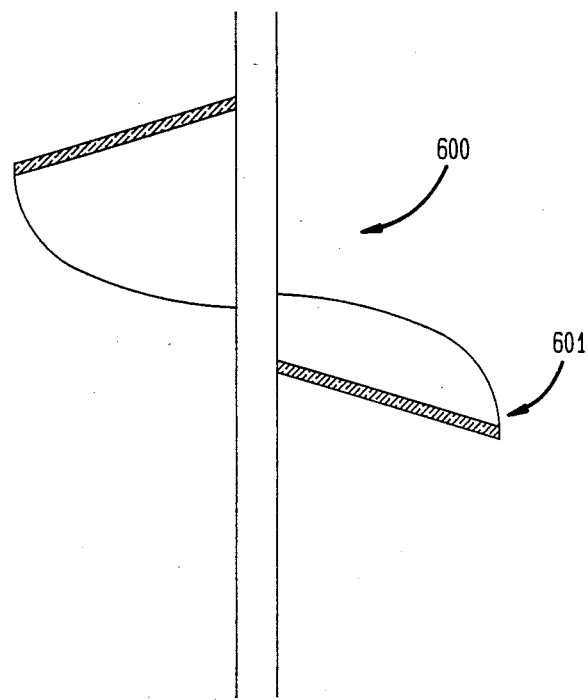
FIG. 6 depicts an axial cross-sectional view of an alternate embodiment of the helical reflector, here cone shaped helical reflector 600.

The image quality of the displayed three-dimensional object can be enhanced by modifying the shape of helical reflector 50 to have a cone form, specifically as shown by helical reflector 600 as depicted in an axial cross-sectional view thereof in FIG. 6. This is achieved by making the periphery of the cross-section of the cone shaped helical reflector lower than the location of its center. The advantage of this approach is that the brightness and line structure of the image is improved. The brightness is improved due to the increasingly direct reflection of light emanating from the reflective surface of the modified helical reflector; the line structure is improved because each frame can now represent a larger segment, such as segment 601, including but not limited to a mere intersecting line segment of the displayed three-dimensional image. Due to the different shape of reflector 600 over that of reflector 50 and specifically the changed focal length between each individual lens that forms anamorphic lens 40 and the corresponding point of the surface of reflector 600 over that for reflector 50, the optical characteristics of the individual lenses that form the anamorphic lens would need to be suitably changed accordingly.

Now, in order to add parallax affects to the displayed three-dimensional object, video camera 85 shown in FIG. 1 detects the current position of the viewer. The video camera continuously scans an area within which the viewer is situated and generates appropriate video signals. The video output of the camera is applied to video processor 80. This processor, in conjunction with internal frame comparison and motion detection circuitry (well known and not specifically shown), determines whether the viewer has moved and, if so, the current position of the viewer. The processor generates the viewer's position in coordinate fashion, e.g. an x,y coordinate pair, over leads 83 for application to display generator 15. Using this positional information, display generator 15 determines, using standard well-known three-dimensional graphics techniques, those external surfaces of the object that would then be visible to the viewer and thereafter re-calculates the intersections between these surfaces and the helical sections of the object which are then displayed. Accordingly, as the viewer moves from side to side or in other ways that would affect the surfaces of the object that he or she sees, the coordinates produced by video processor 80 correspondingly change. This change, in turn, causes the three-dimensional display of the object to change in synchronism with changes in the viewer's perspective. By injecting parallax information into the displayed three-dimensional object, the resulting display not only becomes more accurate but also more realistic than would otherwise occur.

Figure 2:
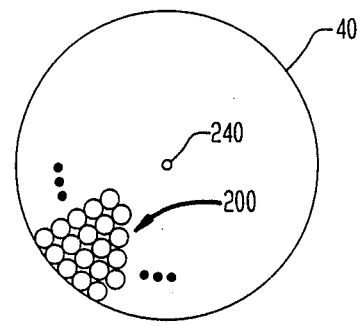
FIG. 2 depicts a top view of one embodiment of anamorphic lens 40 that forms part of system 5 shown in FIG. 1.
Figure 3:
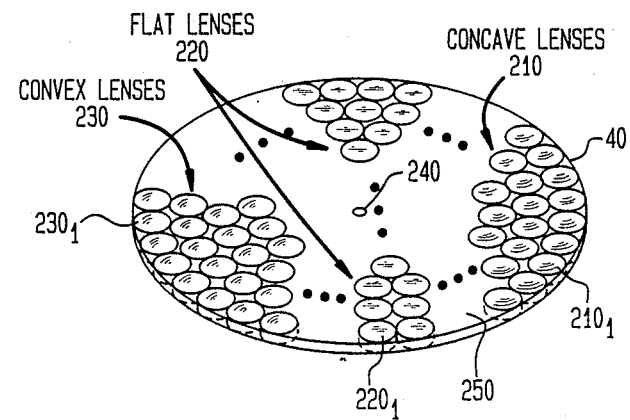
FIG. 3 depicts a perspective view of the embodiment of anamorphic lens 40 shown in FIG. 2.
Figure 4:
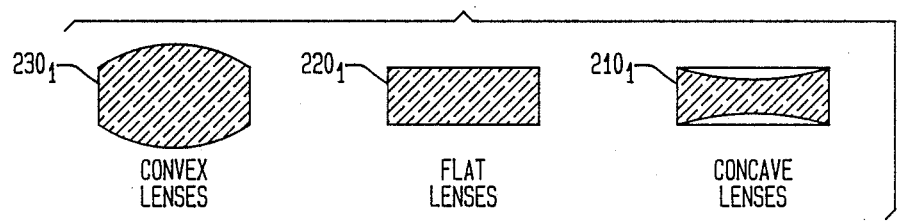
FIG. 4 depicts the typical cross-sectional shapes of the different types of individual lenses that collectively form the embodiment of anamorphic lens 40 shown in FIGS. 2 and 3.

Having now described the system, FIG. 2 depicts a top view of one embodiment, specifically the planar "array" embodiment, of anamorphic lens 40. As described above, lens 40 contains small individual lenses 200 arranged in a closely packed formation. Hole 240 lies at the center of lens 40 for use in mounting the lens to one end of shaft 55 (see FIG. 1). The perspective view of lens 40 shown in FIG. 3 shows, as described above, a necessary positional variation in the contour and hence magnification provided by the individual lenses that collectively form lens 40. Specifically, lenses 210, typified by lens 210₁, which are located in the right side of lens 40 are all concave in cross-section, such as that illustratively shown in the 35 cross-sectional view of lens 210₁ shown in FIG. 4. In contrast, lenses 230, typified by lens 230₁, which are located in the left side of lens 40 are all convex in cross-section, such as that illustratively shown in FIG. 4 for lens 230₁. Convex lenses 230 provide a greater degree of magnification than do concave lenses 210. Moreover, the individual lenses that form concave lenses 210 have somewhat different surface contours (i.e. here different degrees of concavity) amongst themselves and hence different relative magnifications and focal lengths due to the different relative distances between each of these individual lenses and the surface of the helical reflector. Similar surface contour variations, although in terms of convexity, occurs within convex lenses 230. Lenses 220, typified by lens 220₁, situated between concave lenses 210 and convex lenses 230, provide varying degrees of magnification between that associated with a convex and that associated with a concave lens and therefore have an approximately flat contour on each optical surface thereof, such as that shown for the cross-section of lens 220₁ depicted in FIG. 4. All the lenses are contained within common frame 250, as shown in FIG. 3.

Figure 5:
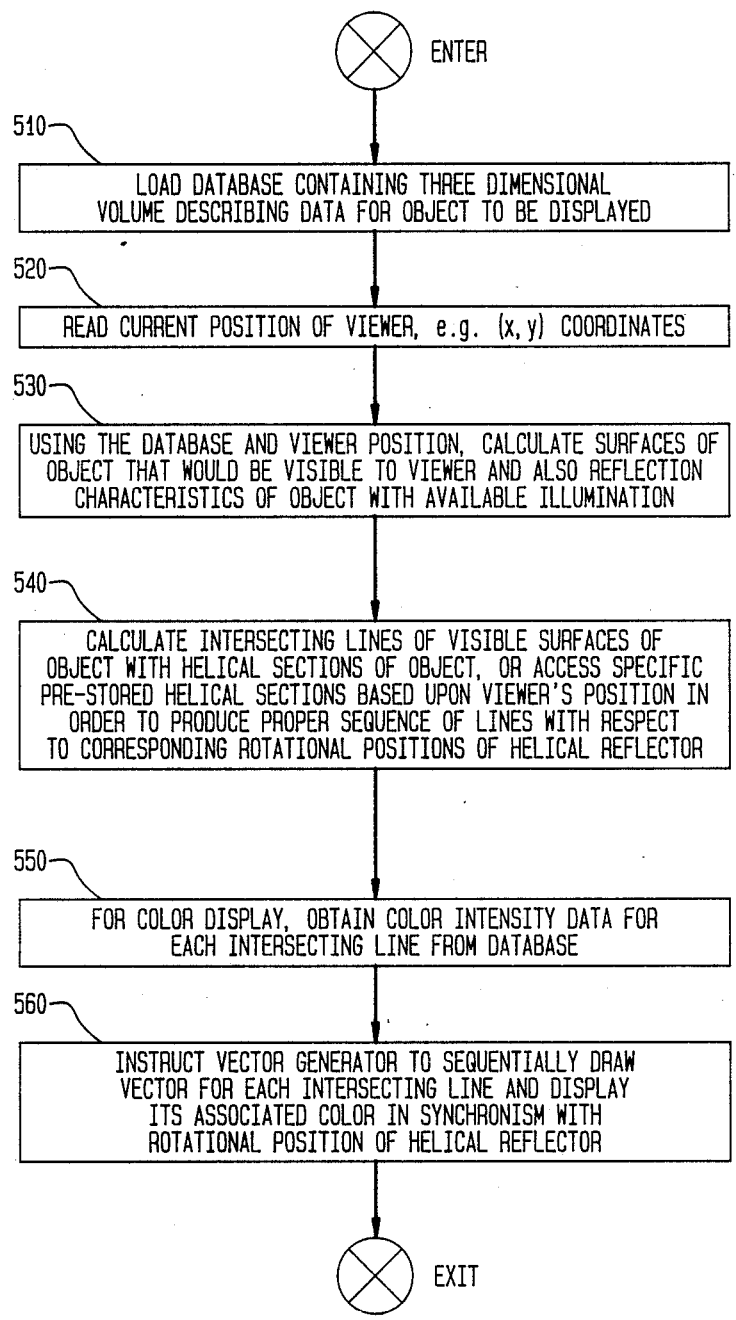
FIG. 5 depicts a high level flowchart of Main Routine 500 that executes within display generator 15 shown in FIG. 1 in order to generate a three-dimensional image of illustratively an object.

Having discussed the hardware that forms my inventive system, the discussion will now conclude by addressing the software. Accordingly, FIG. 5 depicts a high level flowchart of Main Routine 500 that executes within display generator 15 shown in FIG. 1 in order to generate a three-dimensional image of illustratively an object on my inventive system.

Upon entry into routine 500, which occurs upon a specific command to the display generator to generate a three-dimensional image, execution first proceeds to block 510. This block, when executed, loads a database, as described above, that contains three-dimensional volumetric describing data for the object that is to be displayed. This database can be obtained from an external source and is generally loaded into an appropriate file on an hard disk drive located internal to the display generator. Once this database has been completely loaded, execution proceeds to block 520 which reads the current position of the viewer, in (x,y) coordinate form. This position is supplied, as described above and shown in FIG. 1, over leads 83 by video processor 80. After the coordinate position has been read, execution passes, as shown in FIG. 5, to block 530. This block then calculates, using the database, these coordinates, and again through use of well-known three-dimensional graphics techniques, those surfaces of the object that would be visible to the viewer and the reflection characteristics dictated by available illumination that will be incident on the object. After this occurs, block 540 is executed. This block calculates a sequence of the intersecting line segments between the visible surfaces of the object and with each of a series of parallel helical sections of the object, these sections representing incrementally different rotational positions of the helical reflector. This block, if processing time permits, can calculate the helical sections through the object in real-time, using its three-dimensional representation in the database and each successive position of a desired helical section. Alternatively, these sections can be calculated in advance, pre-stored and merely accessed by block 540 during a subsequent formation of a three-dimensional display. These helical sections are calculated, using any of a variety of well-known three-dimensional graphics techniques, to have the same pitch and axial orientation as that of the helical reflector. If an anamorphic lens 40 were to be constructed from a single piece of optical glass, it would likely introduce a degree of anamorphic distortion into each displayed intersecting line segment (vector) projected therethrough. As such, once block 540 calculated each intersecting line segment, this block would then correct that line segment for the expected anamorphic distortion in order to appropriately compensate the displayed image. Substantially no such distortion is expected to occur if the anamorphic lens is constructed using a planar "array" of small lenses, as discussed in detail above. In any event, once the sequence of intersecting line segments has been completely determined, execution proceeds to block 550. If the three-dimensional image is to be displayed in color, then block 550 obtains appropriate color information for each intersecting line segment from the database of the object. On the other hand, if a monochromatic image is to be generated, then no such color information is obtained by this block. Thereafter, execution proceeds to block 560 which, when executed, instructs the vector generator located within display generator 15 (see FIG. 1) to draw a single vector, of an appropriate color(s), on projection CRT 20 for each intersecting line segment in the sequence generated by block 540 and in synchronism with the rotational position of the helical reflector. As such, this block will cause successive vectors to be continuously painted on the screen of projection CRT 20 which, in conjunction with rotating helical reflector 50, will extract "z dimension" information from these vectors and result in a continuous three-dimensional image of the object.

Clearly, those skilled in the art can readily appreciate that although display generator 15 has been described as a workstation which typically operates in a high speed serial fashion, this generator can alternatively utilize parallel processing. Specifically, as the display generator instructs its internal video generator, such as through a dedicated peripheral input/output (I/O) processor, to paint a specific vector on the projection CRT, the generator can through a separate internal graphics processor calculate the next successive intersecting line segment in the sequence and so on. At the same time, a direct memory access (DMA) operation can be underway, through separate specialized memory I/O circuitry, to transfer necessary information from the database for the object and/or from other associated files to random access memory located within the display generator, on a "look ahead" type basis, for subsequent use by the graphics processor in calculating or accessing the next successive helical section. Operating in this fashion saves processing time and provides a faster response.

In addition, although the preferred embodiment has been shown with the projection CRT situated above helical reflector 50, the reflector and lenses 30 and 40 can merely be inverted such that the projection CRT can be built into a desk associated with the workstation used to implement display generator 15 with these optical elements and actuator 60 positioned above the CRT. Since the size of these optical components is not much larger than the viewing volume, these components can be made quite compact, if need be.

Furthermore, although the preferred embodiment includes a video camera and an associated video processor for tracking the position of a viewer and generating coordinates therefor, any one of a variety of other well-known sensors and associated processing circuitry can be used to generate these coordinates.

Although one embodiment of the present invention has been shown and described in detail herein along with certain variants thereof, many other varied embodiments that incorporate the teachings of the invention may be easily constructed by those skilled in the art.

INDUSTRIAL APPLICABILITY AND ADVANTAGES

The present invention is useful in display systems and particularly to display three-dimensional images. The invention advantageously provides more accurate and brighter three-dimensional images than those generally obtainable using mechanized three-dimensional display systems known in the art.

I claim:

1. A system for generating a three-dimensional display of an object to a viewer comprising:
   a helical reflector adapted for rotation about its central axis;
   an anamorphic lens coaxially aligned with and adapted for rotation in unison with said helical reflector;
   a two-dimensional display arranged to project light therefrom through said anamorphic lens onto said helical reflector; and
   a display generator means comprising:
      means, responsive to a database of stored information which contains a three-dimensional description of an object, for determining each successive one in a series of incrementally spaced pre-defined helical sections taken through said object;
      means, responsive to a current position of a viewer and to said database, for ascertaining those surfaces of the object which, if displayed, would be visible to the viewer;
      means for determining a series of intersecting segments, wherein each segment in said series occurs as an intersection between a corresponding one of the helical sections and at least one of said visible surfaces of the object; and
      means for successively and selectively projecting each intersecting segment in said series onto the two-dimensional display in response to a current position of said helical reflector, whereby as said helical reflector rotates the segments projected thereon sweep out a focused three-dimensional volume that depicts the object.

2. The system in claim 1 further comprising a focusing lens, coaxially aligned with said anamorphic lens and situated in an optical path between said anamorphic lens and said two-dimensional display, which in conjunction with said anamorphic lens focuses light incident thereon from a given point on the two-dimensional display onto a pre-defined point on said helical reflector.

3. The system in claim 2 wherein each of the helical sections has substantially the same pitch and axial orientation as the helical reflector.

4. The system in claim 3 wherein the helical reflector is a single turn helix with a constant radius.

5. The system in claim 2 wherein said anamorphic lens comprises a planar array of individual lenses secured within a common frame wherein individual ones of said lenses possess different magnifying powers based upon the position of the individual one lens in the anamorphic lens and a corresponding vertical spacing between a reflective surface of said helical reflector and a surface of said anamorphic lens.

6. The system in claim 5 wherein each of said helical sections has substantially the same pitch and axial orientation as the helical reflector and two successive ones of said helical sections of said object have an associated spacing therebetween and referenced to said object that corresponds to spacing between successive corresponding ones of the segments that form a three-dimensional display of the object.

7. The system in claim 6 wherein the helical reflector is a single turn helix with a constant radius.

8. The system in claim 7 further comprising means for determining the current position of the viewer.

9. The system in claim 8 wherein said current position determining means comprises:
   a video camera for producing video signals of an area containing said viewer; and
   means for processing said video signals to generate signals containing coordinate information that defines the current position of the viewer.

10. The system in claim 9 wherein the display generator comprises a graphics workstation.

11. The system in claim 5 wherein said anamorphic lens further comprises:
    first ones of said individual lenses contained within a first portion of said planar array, wherein each of said first ones of said individual lenses has a concave shaped cross-section and possesses a magnifying power within a first band of values;
    second ones of said individual lens contained within a second portion of said planar array, wherein each of said second ones of said individual lenses has a convex shaped cross-section and possesses a magnifying power within a second band of values, said second band spanning larger values than said first band; and
    third ones of said individual lenses contained within a remaining portion of the reflector, intermediate said first and second portions, wherein each of said third ones of said individual lenses has a relatively flat surface contour and possesses a magnifying power within a third band of values, wherein said third band encompasses values intermediate said first and second bands.

12. The system in claim 2 wherein said anamorphic lens comprises a single piece of optical material having a continuous surface.

13. The system in claim 2 wherein each helical section has substantially the same pitch and axial orientation as the helical reflector.

14. The system in claim 13 wherein two successive ones of said helical sections of said object have an associated spacing therebetween and referenced to said object that corresponds to spacing between successive corresponding ones of the segments that form a three-dimensional display of the object.

15. The system in claim 2 further comprising means for determining the current position of the viewer.

16. The system in claim 15 wherein said current position determining means comprises:
    a video camera for producing video signals of an area containing said viewer; and means for processing said video signals to generate signals containing coordinate information that defines the current position of the viewer.

17. The system in claim 2 wherein the display generator comprises a graphics workstation.

18. In a system for generating a three-dimensional display of an object to a viewer comprising a helical reflector adapted for rotation about its central axis; an anamorphic lens coaxially aligned with and adapted for rotation in unison with said helical reflector; a focusing lens, which in conjunction with said anamorphic lens, focuses light incident thereon from a given point on a two-dimensional display onto a pre-defined point on said helical reflector; a two-dimensional display arranged to project light therefrom through said focusing lens and said anamorphic lens onto said helical reflector; a method comprising the steps of:
  determining, in response to a database of stored information which contains a three-dimensional description of an object, each successive one in a series of incrementally spaced pre-defined helical sections taken through said object;
  ascertaining, in response to a current position of a viewer and to said database, those surfaces of the object which, if displayed, would be visible to the viewer;
  determining a series of intersecting segments, wherein each segment in said series occurs as an intersection between a corresponding one of the helical sections and at least one of said visible surfaces of the object; and
  successively and selectively projecting each intersecting segment in said series onto the two-dimensional display in response to a current position of said helical reflector, whereby as said helical reflector rotates the segments projected thereon sweep out a focused three-dimensional volume that depicts the object.

19. The method in claim 18 further comprising the step of calculating and storing all of said helical sections prior to generating any portion of said three-dimensional display.

20. The method in claim 18 wherein the focusing lens is coaxially aligned with said anamorphic lens.

21. The method in claim 20 wherein each of the helical sections has substantially the same pitch and axial orientation as the helical reflector.

22. The method in claim 21 wherein the helical reflector is a single turn helix with a constant radius.

23. The method in claim 22 further comprising the step of calculating and storing all of said helical sections prior to generating any portion of said three-dimensional display.

24. The method in claim 20 wherein each of said helical sections has substantially the same pitch and axial orientation as the helical reflector and two successive ones of said helical sections of said object have an associated spacing therebetween and referenced to said object that corresponds to spacing between successive corresponding ones of the segments that form a three-dimensional display of the object.

25. The method in claim 24 wherein the helical reflector is a single turn helix with a constant radius.

26. The method in claim 25 further comprising the step of determining the current position of the viewer.

27. The method in claim 26 wherein said current position determining step comprises the steps of:
  producing video signals of an area containing said viewer; and
  processing said video signals to generate signals containing coordinate information that defines the current position of the viewer.

28. The method in claim 27 further comprising the step of calculating and storing all of said helical sections prior to generating any portion of said three-dimensional display.

29. The method in claim 20 wherein two successive ones of said helical sections of said object have an associated spacing therebetween and referenced to said object that corresponds to spacing between successive corresponding ones of the segments that form a three-dimensional display of the object.

30. The method in claim 20 further comprising the step of determining the current position of the viewer.

31. The method in claim 30 wherein said current position determining step comprises the steps of:
  producing video signals of an area containing said viewer; and
  processing said video signals to generate signals containing coordinate information that defines the current position of the viewer.

32. The method in claim 31 further comprising the step of calculating and storing all of said helical sections prior to generating any portion of said three-dimensional display.

* * * * *